Feb. 12, 1929.
F. E. COMSTOCK
1,702,074
UNIVERSAL FISH BAIT
Filed May 20, 1926
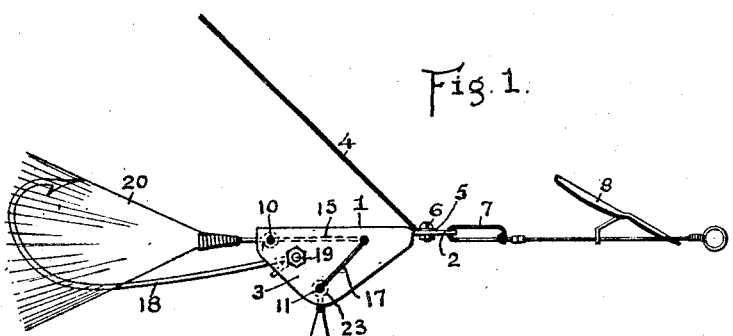
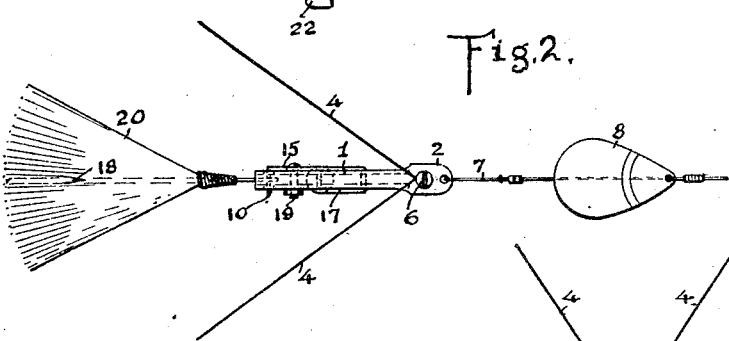
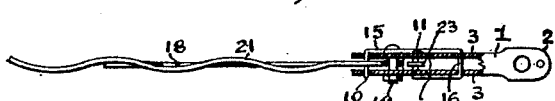 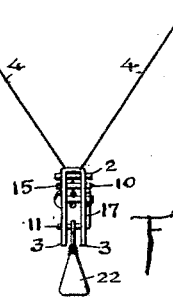
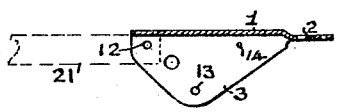 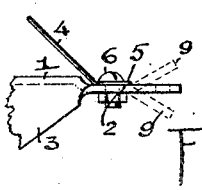
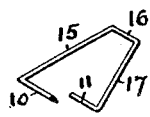
Frederick E. Comstock Inventor
By H. S. Amstutz
Attorney Patented Feb. 12, 1929.

1,702,074

UNITED STATES PATENT OFFICE.

FREDERICK E. COMSTOCK, OF VALPARAISO, INDIANA.

UNIVERSAL FISH BAIT.

Application filed May 20, 1926. Serial No. 110,344.

My invention relates to improvements in universal fish bait and it more especially relates to the features pointed out in the annexed claims.

The purpose of my invention is to provide a universal fish bait that is weedless; that admits of the substitution of various kinds of hooks; that may use different kinds of bait interchangeably; and that also admits of an interchange of different sized weights.

With these and other ends in view, I illustrate in the accompanying drawing such instances of adaptation as will disclose the broad underlying features of my invention without limiting myself to the specific details shown thereon and described herein.

Figure 1 is a side elevation.

Fig. 2 is a top plan view.

Fig. 3 is also a top plan view, partly in section.

Fig. 4 is a rear end elevation.

Fig. 5 is a side elevation in section.

Fig. 6 is a detached elevation of the nose end of my bait.

Fig. 7 is a perspective view of a detached bait and weight holding fastener.

In practically carrying out my invention I may use any desired alternative forms of construction which lend themselves to the universal features of my bait without departing from the spirit of my invention.

The body 1 of my bait may be formed of thin sheet metal bent in the shape of an inverted U with depending sides 3 and a flattened forward projecting nose 2. A two-pronged weed guard 4 is replaceably fastened on the top of the nose 2 by means of fastening screw 6 which passes through the eye 5 of the weed guard. A spinner link 7 is attached to the nose end and a spinner 8 of any desired type is mounted on the link for free movement.

The bait is provided with attachable and detachable means for the lures 20 and 21 and the weight 22, or for any substitutes that the user may desire to attach to the bait. In the case of lure substitutes these may comprise pork rind, buck tail, hackle, pork chunk or any desired yarn lures. The weed guard may be a single flat strip or wire if desired.

The unitary fastening for lures and different sizes of weights comprises a double functioning spring, separately shown in Fig. 7, which has a lengthwise portion 15, a transverse portion 16 passing through holes 14 formed in the sides 3 and an angular portion 17. The rear end of the lengthwise portion is bent at about right angles to form a pointed lure holder 10 which passes freely through holes 12. The angular portion 17 terminates in the right angle bend 11 that passes through holes 13 formed in the sides 3. The portions 15 and 17 lie closely against the sides 3 and by reason of the transverse portion 16 being approximately the same dimension as the over-all thickness of the body where the holes 14 are formed serves to snugly hold the spring against sidewise movement.

An interchangeable hook 18 is attachably and detachably secured between the sides 3 by means of a pivot screw 19 held in assembled relation by a nut as shown in Figs. 1, 2 and 3. This nut serves a double purpose. If only screwed up to prevent the dissembling of the parts the hook 18 is free to move up and down without hindrance. If, however, it is desired to rigidly hold the hook against movement, the nut is screwed up tightly so as to clamp the sides 3 against the eye and shank of the hook. The replaceable weight 22 has an eye 23 by means of which it is freely suspended on the fastening portion 11 of the spring 16. The front or nose end of the bait 2 may, if desired, be bent upward, downward or sidewise at 9 so as to lead the bait in different directions. The weight 22, as shown in Fig. 1, is free to swing rearward so as to not become snagged in the crotch of submerged branches, etc.

An important feature of my bait is the way in which I am enabled to fasten pork rind lures. Pork rind is ordinarily fastened to artificial baits flatwise which presents a very thin edge to the fish. In contrast to this method of fastening, I secure pork rinds edgewise between the sides 3 in which position the full width of the pork rind is in front of the fish; in addition, this method of fastening causes the pork rind to have a wiggly or wave-like motion. By positioning the pork rind vertically instead of horizontally, I secure advantages which are not procurable when the pork rind is fastened to the bait flatwise; that is, with the edges of the pork rind in a horizontal position instead of vertical as I use them. Another advantage of this method of attachably securing pork rind is that it lies closely alongside of the hook which makes it unnecessary to pierce the pork rind so that it may pass over the hook.

The front of the body 1 is formed at an angle so as to permit the bait to freely pass over obstructions of one kind or another. The hook 18 is free to move up and down on its pivot 19. Its barbed end, when buck tail or yarn lures are used may be almost entirely invisible.

As heretofore stated, I do not limit myself to the exact shape of the various parts for it is understood that in the role of a universal bait, the various replaceable attachments that may be used on it are largely subject to the individual likes or dislikes of the user. For instance, in the matter of the changeable weights, where streams are swift and fishing is being done for wall-eyed pike that habitually swim near the bottom of the stream, a heavier weight is used. It is of course understood the bait may be used with or without a spinner or so called spoon. In case fishing is being done with live bait the various lures may be dispensed with and the bait attached directly on the hook 18.

What I claim is:

1. A universal fish bait comprising a horizontal body with bent over depending sides forming a channel therebetween, a weed guard secured to the flattened front end of the body, a lure, a hook, and a weight all detachably secured between the depending sides of the body for free and independent movement.

2. A universal fish bait comprising a sheet metal body bent over onto itself to form two sides with a narrow channel therebetween, a front end flattened at approximate right angles to the sides, a double purpose unitary spring secured to the sides and having terminating ends which pass across the open space between the sides, a lure secured in the open space on one end of the spring, a weight positioned in the open space near the bottom of the sides at the other end of the spring, and a hook located in the open space between the lure and the weight said hook having free up and down movement.

3. As a new article of manufacture, a universal artificial bait comprising a suitable horizontal body formed with depending sides spaced apart, a replaceable lure attached to the body near its rear upper edge, a replaceable weight positioned between the sides near their lower edge, a replaceable hook also positioned between the sides above the weight and below the lure, and a weed guard projecting upward and rearward from the front end of the body.

4. As a new article of manufacture, a universal artificial bait comprising a light weight sheet metal body having depending sides spaced apart so as to form a narrow channel therebetween, a pivot screw supported by the sides and spanning the channel, a hook suspended on the screw, and means external of the sides for holding the hook free to move on the pivot screw or rigidly securing it in different positions by clamping the sides against it.

In testimony whereof I affix my signature.

FREDERICK E. COMSTOCK.